United States Patent [19]

Heavner et al.

[11] 4,133,624
[45] Jan. 9, 1979

[54] MOLDED GLOVE AND FORM THEREFOR HAVING TEXTURED WRIST PORTION FOR THE ELIMINATION OF CUFF ROLL-DOWN

[75] Inventors: Paul W. Heavner, Kettering; William E. LeMay, Waynesville, both of Ohio

[73] Assignee: Baxter Travenol Laboratories, Inc., Deerfield, Ill.

[21] Appl. No.: 831,037

[22] Filed: Sep. 6, 1977

Related U.S. Application Data

[62] Division of Ser. No. 723,347, Sep. 15, 1976, abandoned.

[51] Int. Cl.² ............................................. B29C 13/00
[52] U.S. Cl. ........................................ 425/275; 2/159; 2/168
[58] Field of Search ................. 425/275, 93, 269, 392; 2/159, 162, 168

[56] References Cited

U.S. PATENT DOCUMENTS

| | | | |
|---|---|---|---|
| 1,206,102 | 11/1916 | Gibson | 2/159 |
| 1,931,324 | 10/1933 | Newton | 425/275 X |
| 1,951,402 | 3/1934 | Gammeter | 425/275 |
| 2,779,055 | 1/1957 | Burger | 425/393 |
| 3,541,609 | 11/1970 | Povlois et al. | 2/168 |

FOREIGN PATENT DOCUMENTS

1132599 11/1968 United Kingdom ........................ 2/162

*Primary Examiner*—Robert L. Spicer, Jr.
*Attorney, Agent, or Firm*—Paul C. Flattery; John P. Kirby, Jr.; Gary W. McFarron

[57] ABSTRACT

A molded glove defines a hand and wrist portion, with the wrist portion defining, in as-molded configuration, longitudinal channels positioned about its circumference. In accordance with this invention, a plurality of circumferential channels are defined on the wrist portion at the end remote from the hand portion, the circumferential channels crossing the longitudinal channels. The thickness of the glove along the longitudinal and circumferential channels is increased over the thickness of the glove in areas adjacent to the channels. The glove exhibits improved resistance to rolling down of the cuff while being worn, when compared with conventional gloves having longitudinal flutes or channels, gloves having beaded cuffs, and the like.

4 Claims, 2 Drawing Figures

U.S. Patent     Jan. 9, 1979     4,133,624
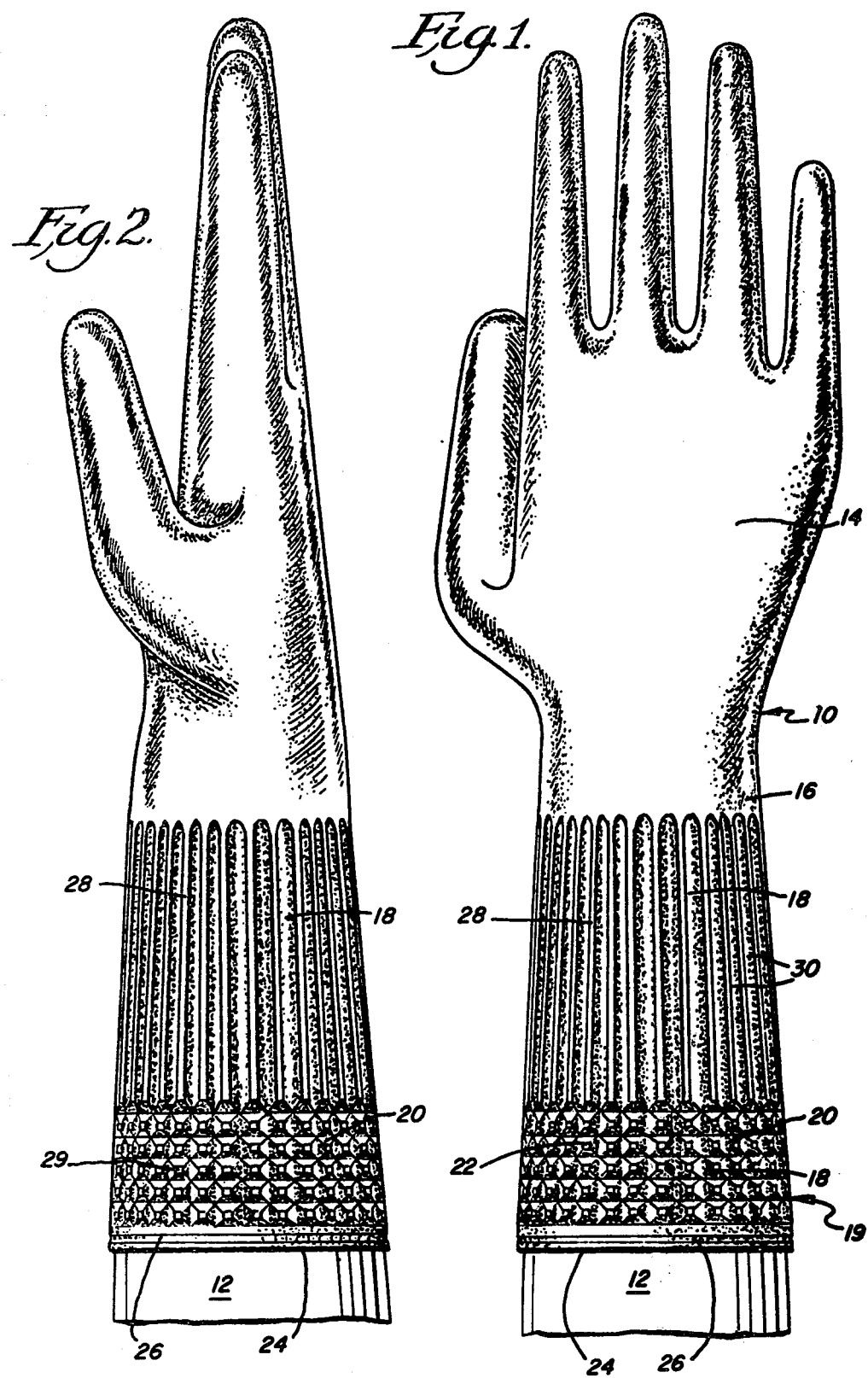

MOLDED GLOVE AND FORM THEREFOR HAVING TEXTURED WRIST PORTION FOR THE ELIMINATION OF CUFF ROLL-DOWN

CROSS-REFERENCE TO RELATED APPLICATION

This is a division of application Ser. No. 723,347, filed Sept. 15, 1976, now abandoned.

BACKGROUND OF THE INVENTION

Gloves are commercially molded on hand-shaped glove forms by dipping the forms into a liquid rubber formulation such as a latex, a vinyl plastisol, or the like. The dip mold is then withdrawn, generally with the finger portions of the glove and mold facing downwardly, and the film of rubber formulation is allowed to cure, usually assisted by a heating step. Thereafter, the rubber gloves are stripped off of the molds for packaging and distribution.

Rubber gloves have a tendency for their cuffs to roll down along the wrist portion during use. For this reason, some commercially available gloves are provided with relatively thick, circumferential bands or beaded cuffs, in an attempt to minimize the cuff roll-down problem.

Another company sells a glove which defines longitudinal fluting or channels positioned about the circumference of the wrist portion, with a similar end in mind.

The problem is particularly burdensome in the area of surgeon's gloves, in view of the critical nature of the surgeon's activity, and also in view of the danger that the sterile field on the gloves may be compromised by attempts to reroll the glove back upwardly along the surgeon's arm.

The invention of this application provides a glove, and a dipping mold for manufacturing such gloves, in which the molded pattern impressed on the wrist portion of the glove provides a significant improvement in the capability of the gloves to avoid the cuff roll-down problem, without the need of resorting to bands or beads about the cuffs, which are difficult to mold or attach to the gloves. This invention can provide significantly improved results over corresponding gloves exhibiting only longitudinal flutes or channels, as well as many banded or beaded-cuff gloves. The glove of this invention is easily manufactured by conventional dipping processes, and thus provides improved performance without any significant addition in manufacturing costs.

DESCRIPTION OF THE INVENTION

In accordance with this invention, a molded glove, and a mold for the glove, is provided defining a hand and wrist portion. The wrist portion defines, in as-molded configuration, longitudinal channels positioned about its circumference. A plurality of first circumferential channels, for example five to ten channels, are defined on the wrist portion at an end remote from the hand portion, the circumferential channels crossing the longitudinal channels. The thickness of the glove along the longitudinal and circumferential channels is increased over the thickness of the glove in areas adjacent to the channels. As a result of this, the glove exhibits improved resistance to rolling-down of the cuff while being worn.

Without wishing to be limited to a single theory of operation why the glove of this invention shows improvement over corresponding gloves of the prior art, it is believed that the crossing channel configuration utilized in this invention causes the wrist portion at the place which defines the crossing channels to be slightly constricted by the existence of the channels, when compared with the rest of the wrist portion, which may optionally define longitudinal channels alone. Accordingly, the increased constriction acts as an improved reinforcing band about the cuff of the glove, tending to reduce cuff roll-down.

The longitudinal channels may extend along the wrist portion of the glove toward the hand portion beyond the area which defines the circumferential channels. Alternatively, the longitudinal and circumferential channels may be limited to essentially the same area of the glove.

Typically, the longitudinal channels may terminate short of the end of the wrist portion, remote from the hand portion. Spaced from the terminating longitudinal channels, adjacent the remote end of the wrist portion, a terminal, circumferential channel may be positioned about the wrist portion, to provide additional resistance against rolling down of the cuff.

In the drawing, FIG. 1 is an elevational view of the glove of this invention, as molded upon a dip mold of corresponding shape.

FIG. 2 is an elevational view of the glove of FIG. 1, mounted on its mold and rotated by 90° from the view of FIG. 1.

Referring to the drawings, a glove 10 is disclosed, which has been prepared by the dipping in conventional manner of dip mold or form 12, which has a shape corresponding to glove 10, in a liquid formulation of latex, vinyl plastisol, or the like. After curing, the glove may be removed from the form by conventional stripping, for packaging and distribution.

Form 12, and glove 10 in its as-molded shape, is shown to exhibit the shape as described in U.S. Pat. No. 3,613,172, modified as described herein. However, it is contemplated that the invention of this application can be utilized on molded, elastic gloves and glove molds of essentially any desired shape.

The glove of this invention exhibits a hand portion 14, formed by the corresponding hand portion of mold 12 underneath portion 14 of the glove; and a wrist portion 16, defined by a corresponding wrist portion of mold 12 of similar shape.

Glove 10 and mold 12 each define a plurality of longitudinal channels 18, positioned about the circumference of wrist portion 16 as shown, generally completely around the entire circumference of the wrist portion. However, if desired, a small blank area (not shown) may be left to permit the placement of an embossed indication of size or a manufacturer's logo on the mold, and thus also the glove.

In accordance with this invention, several circumferential grooves 20, crossing the longitudinal grooves 18, are defined to provide a cross-hatched area at the cuff portion 19 of glove 10, produced by corresponding grooves in mold 12. The crossing grooves result in the creation of generally truncated pyramidal structures 22, each defining four lateral sides as shown, in both glove 10 and mold 12.

Longitudinal channels 18 terminate short of the end of wrist portion 16 which is remote from the hand portion 14. A terminal circumferential channel 26 is positioned adjacent end 24, being defined by mold 12 and correspondingly produced in glove 10.

It is generally preferred for the channels 18, 20 of the mold, and the corresponding gloves formed thereon, to define a width of about ⅛ to 3/16 inch, and a depth of about 1/16 to 3/32 inch, and to be laterally spaced from each other by a distance of less than the width of said channels.

Channel 26 may be narrower than the other channels, but may be of generally equal depth.

It is also generally preferred for the thickness at the fingertips of the gloves, as molded, to be from 0.006 to 0.009 inch (most preferably 0.007 inch), with the thickness of the gloves at the portions 28, 29 adjacent to and between the channels, being in a similar range of thickness. Under this circumstance, the thickness of the glove material within both the first circumferential and longitudinal channels may be thicker than at the fingertips and the areas between the channels: preferably from 0.009 to 0.015 inch, measured at the bottoms of the channels. This selective thickening of the glove thickness is believed to significantly improve the resistance of the glove to cuff roll-down.

As shown, portions 30 of longitudinal channels 18 are free of crossing channels 20, and extend upwardly along the wrist portion toward the hand portion 14. It is also contemplated that this portion 30 of the longitudinal channels can be eliminated, if desired, with the cuff roll-down preventive feature of this invention being limited to the crossing channel area.

The above has been offered for illustrative purposes only, and is not for the purpose of limiting the invention of this application, which is as defined in the claims below.

That which is claimed is:

1. In a dip-type mold for a glove defining a hand and wrist portion for forming corresponding hand and wrist portions of a glove molded thereon, said wrist portion defining longitudinal channels positioned about its circumference, the improvement comprising, in combination:

a plurality of first circumferential channels defined on said wrist portion and positioned at an end thereof remote from the hand portion, said circumferential channels crossing said longitudinal channels, to form corresponding channels in a glove molded thereon.

2. The mold of claim 1 in which said longitudinal channels terminate short of the end of said wrist portion which is remote from said hand portion, said glove mold also defining, at said remote end and spaced from said longitudinal channels, a terminal circumferential channel positioned about said wrist portion.

3. The mold of claim 2 in which the width of said first circumferential and longitudinal channels is from ⅛ to 3/16 inch, and the depth of said channels is from 1/16 to 3/32 inch.

4. The mold of claim 1 in which said longitudinal channels extend along said wrist portion toward said hand portion beyond the area occupied by said first circumferential channels.

* * * * *